(12) United States Patent
Benzel

(10) Patent No.: US 9,402,401 B1
(45) Date of Patent: Aug. 2, 2016

(54) EXTRUDED THREE LOOP PRETZEL HAVING A TWIST-KNOT APPEARANCE AT ITS MIDDLE PORTION, APPARATUS AND DIE FOR MAKING SAID PRETZEL, AND METHOD OF FORMING SAID PRETZEL

(76) Inventor: William P. Benzel, Hollidaysburg, PA (US)

( * ) Notice: Subject to any disclaimer, the term of this patent is extended or adjusted under 35 U.S.C. 154(b) by 817 days.

(21) Appl. No.: 12/290,767

(22) Filed: Nov. 3, 2008

(51) Int. Cl.
  *A21C 9/04* (2006.01)
  *A47J 37/12* (2006.01)
  *A21C 11/16* (2006.01)

(52) U.S. Cl.
  CPC ..................... *A21C 11/16* (2013.01)

(58) Field of Classification Search
  CPC ..................................................... A23P 1/125
  USPC ................ 99/450.1, 348, 324, 386, 353, 352;
                426/499, 496, 665; 425/323, 145
  See application file for complete search history.

(56) References Cited

U.S. PATENT DOCUMENTS

| | | | | |
|---|---|---|---|---|
| 3,724,980 A * | 4/1973 | Lassmann et al. | ............ | 425/102 |
| 3,782,876 A * | 1/1974 | Groff | ............ | 425/232 |
| 3,799,724 A * | 3/1974 | Grady | ............ | 425/311 |
| 3,876,815 A * | 4/1975 | Kurzius | ............ | 426/499 |
| 3,935,807 A * | 2/1976 | Main et al. | ............ | 99/352 |
| D247,734 S * | 4/1978 | Ryan, Jr. | ............ | D7/675 |
| 4,288,463 A * | 9/1981 | Groff et al. | ............ | 426/500 |
| 4,691,625 A * | 9/1987 | Blain et al. | ............ | 99/348 |
| 4,759,939 A | 7/1988 | Keller et al. | | |
| 4,880,653 A | 11/1989 | Keller et al. | | |
| 4,883,417 A * | 11/1989 | Morikawa et al. | ............ | 425/140 |
| 5,009,910 A * | 4/1991 | Zwicker | ............ | 426/499 |
| 5,277,104 A * | 1/1994 | Colaner | ............ | 99/331 |
| D349,015 S * | 7/1994 | Kaiser | ............ | D7/675 |
| 5,494,428 A | 2/1996 | Piller | | |
| 5,580,599 A * | 12/1996 | Fehr | ............ | 426/499 |
| 5,766,663 A * | 6/1998 | Neumann et al. | ............ | 426/499 |
| 5,955,118 A | 9/1999 | Powell | | |
| 6,276,919 B1 * | 8/2001 | Jensen et al. | ............ | 425/323 |
| 2001/0053401 A1 * | 12/2001 | Lanner et al. | ............ | 426/94 |

OTHER PUBLICATIONS

Product literature (2 sheets) entitled "Reading Pretzel & Snack Pretzel Snack Production"; source: Reading Pretzel & Snack; date: uncertain.
Product literature (1 page) showing pretzel production line including a Spectrum Oven; source: uncertain (likely by Reading Pretzel & Snack); date: uncertain.
9 webpages from Reading Pretzel & Snack found at www.readingbakery.com, entitled "Reading Bakery Systems T.L. Green Biscuit & Cracker—Reading Pretzel & Snack"; date: printed out on Sep. 17, 2008.

* cited by examiner

*Primary Examiner* — Tu B Hoang
*Assistant Examiner* — Alba Rosario-Aponte
(74) *Attorney, Agent, or Firm* — John F. A. Earley, III; Frank J. Bonini, Jr.; Harding, Earley, Follmer & Frailey, P.C.

(57) ABSTRACT

A process and an apparatus for making an extruded pretzel, in which dough is extruded into and through a die to shape the dough into a three loop pretzel shape having a portion having an appearance of a twist-knot associated with a twisted pretzel formed by twisting and folding a rope of pretzel dough over and on itself.

16 Claims, 4 Drawing Sheets

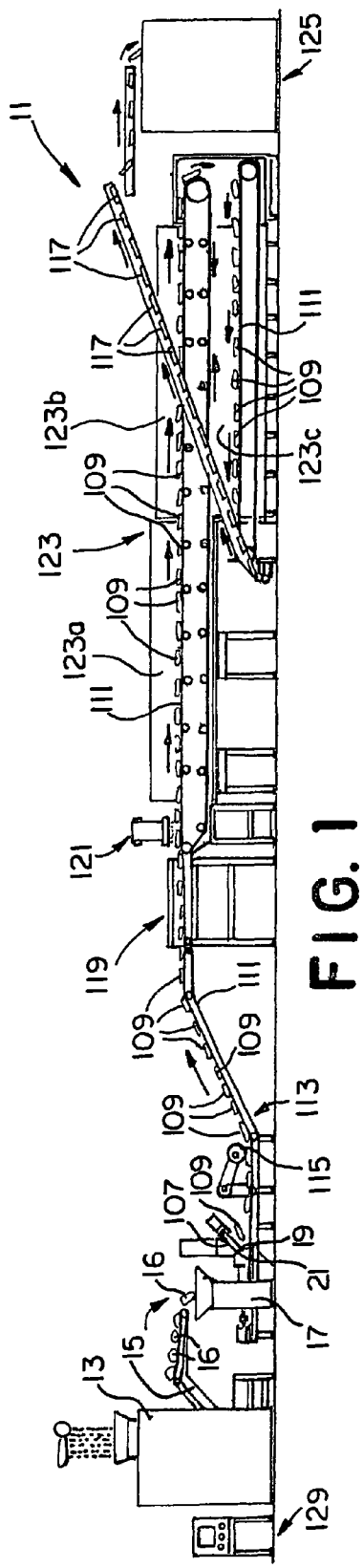
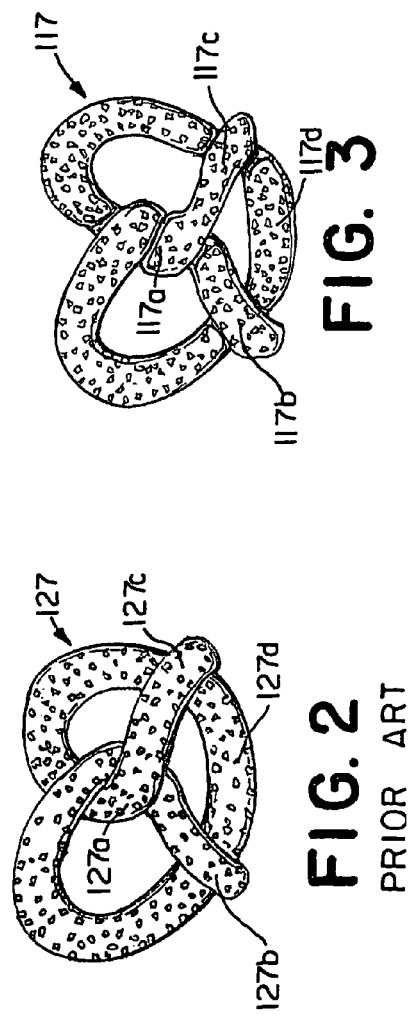
FIG. 1
FIG. 3
FIG. 2
PRIOR ART

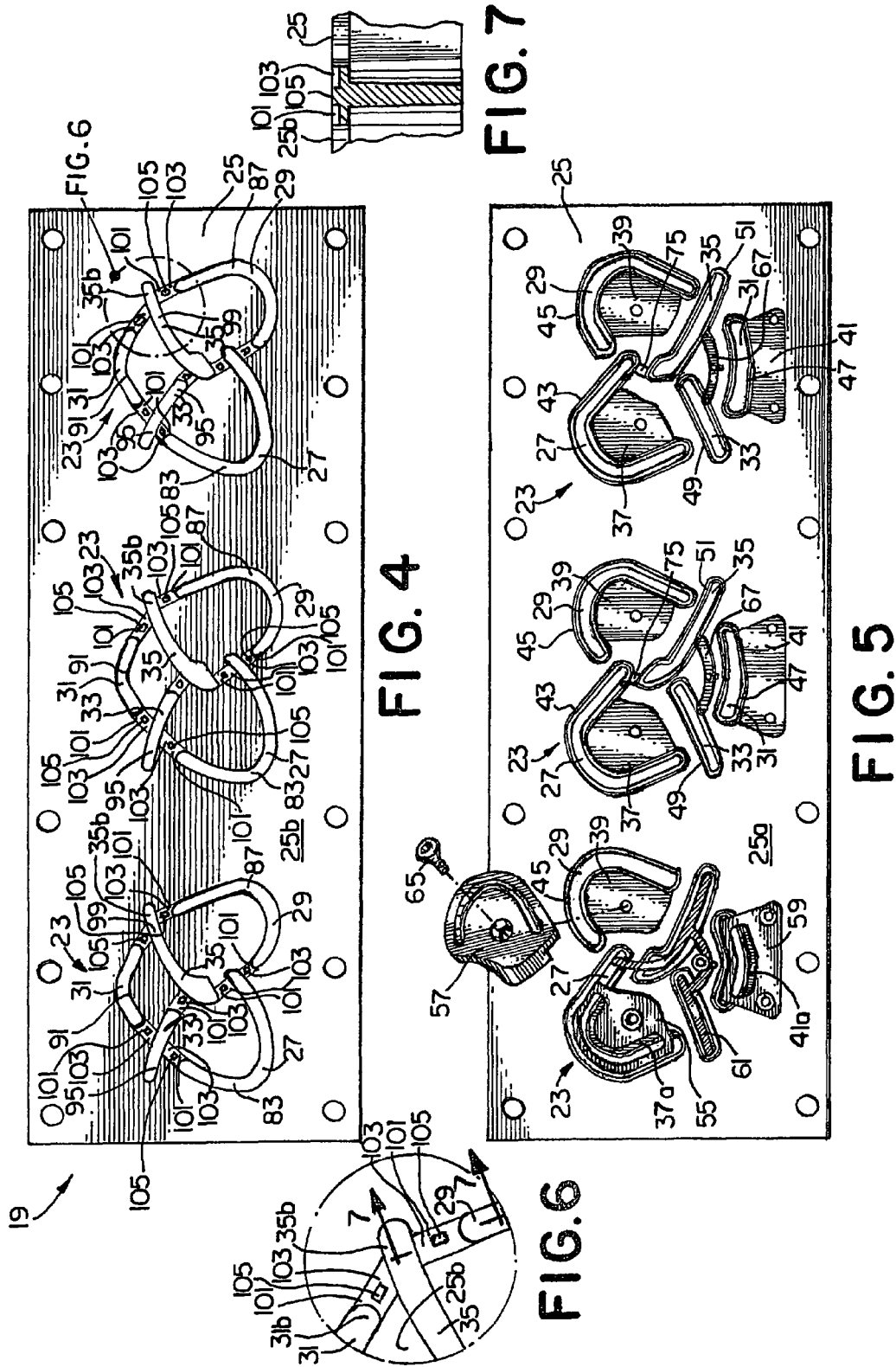

EXTRUDED THREE LOOP PRETZEL HAVING A TWIST-KNOT APPEARANCE AT ITS MIDDLE PORTION, APPARATUS AND DIE FOR MAKING SAID PRETZEL, AND METHOD OF FORMING SAID PRETZEL

BACKGROUND OF THE INVENTION

1. Field of the Invention

The present invention relates to pretzels, and in particular to an extruded three loop pretzel having a twist-knot appearance at its middle portion, apparatus and die for making such an extruded pretzel, and a process for making such an extruded pretzel.

2. Brief Description of the Prior Art

Early on, a twisted pretzel was traditionally formed by rolling pretzel dough into a pretzel dough rope and then manually twisting and folding the pretzel dough rope over and on itself to create a twisted pretzel. This early on process of making hand made pretzels was very labor intensive.

Later on, various pretzel forming equipment was created to reduce the labor intensiveness associated with forming twisted pretzels by hand while maintaining the twisted pretzel look of the hand made traditionally formed old fashion pretzel, the twist-knot portion of the old fashion pretzel contributing to the appeal and charm of the old fashion pretzel. For example, a pretzel twisting machine, developed by AMF, for forming twisted pretzels, using pretzel dough which has been rolled into a pretzel dough rope, twists the pretzel dough rope and folds the pretzel dough rope over onto itself to create a pretzel having a twisted pretzel configuration. Specifically, the middle portion of the pretzel dough rope is blocked from moving, and the end pieces of the pretzel dough rope are engaged by grippers, which move to simulate the twisting and folding motions used by bakers when forming twisted pretzels by hand, to form a machine made twisted pretzel. More recent pretzel twisting machines include those disclosed in U.S. Pat. Nos. 5,955,118 and 5,494,428, both of which are incorporated herein by reference. However, while pretzel twisting machines greatly increase the production rate of producing pretzels over the production rate for making pretzels by hand, pretzel twisting machines are somewhat complicated and subject to mechanical breakdown, thereby creating maintenance problems. Also, pretzels produced using pretzel twisting machines are subject to high breakage during production and packaging. Further, producing pretzels using a pretzel twisting machine often requires personnel to manually feed pretzel dough into the system and to watch over the system as pretzels are being formed by the pretzel twisting machines to make sure that the twisted pretzels are being properly produced.

Extruders are often used in the production of pretzels. For instance, in some cases, an extruder is used to form pretzel dough ropes, which are then fed to a pretzel twisting machine to be twisted and folded into twisted pretzels when making either hard twisted pretzels or soft twisted pretzels. In other cases, an extruder is used to form non-twisted pretzels, such as pretzel sticks, waffle-shaped pretzels, and three looped pretzels (often referred to as "minis") which look like twisted pretzels except that they lack the overlapping portions a pretzel made using a pretzel twisting machine would have.

SUMMARY OF THE INVENTION

It is an object of the invention to provide an extruded three loop pretzel having the twisted pretzel appearance associated with twisted pretzels made by hand or with the use of a pretzel twisting machine.

It is another object of the invention to provide a three loop pretzel having the twisted pretzel appearance associated with twisted pretzels made by hand or with the use of a pretzel twisting machine, without actually forming the twisted pretzel by hand or without using a pretzel twisting machine that twists pretzel dough rope and folds it over and onto itself to create the twisted pretzel.

It is another object of the invention to provide an apparatus and a die for making an extruded three loop pretzel having the twisted pretzel appearance associated with twisted pretzels made by hand or with the use of a pretzel twisting machine, without actually twisting and folding the pretzel dough by hand into a twisted pretzel shape and without using a pretzel twisting machine that twists pretzel dough rope and folds it over and onto itself to create a twisted pretzel shape.

Still another object of the invention is to provide a process for making a three loop pretzel having the twisted pretzel appearance associated with twisted pretzels made by hand or with the use of a pretzel twisting machine, without actually making the pretzel by hand and without using a pretzel twisting machine that twists pretzel dough rope and folds it over and onto itself to create the twisted pretzel.

These and other objects are accomplished by my invention which is set out below.

BRIEF DESCRIPTION OF THE DRAWINGS

FIG. 1 is a schematic representation of a production line, constructed in accordance with the invention, suitable for producing a three loop pretzel having the twisted pretzel appearance associated with twisted pretzels made by hand or with the use of a pretzel twisting machine.

FIG. 2 is a top plan view of a prior art twisted pretzel formed by twisting and folding a pretzel dough rope over and on itself. The prior art twisted pretzel shown in FIG. 2 has a twist-knot located where the pretzel dough rope was twisted and folded over and on itself.

FIG. 3 is a top plan view of a pretzel of the invention. The pretzel of FIG. 3 has a twisted pretzel appearance associated with twisted pretzels made by twisting and folding a pretzel dough rope over and on itself by hand or with the use of a pretzel twisting machine. The pretzel of FIG. 3 also has a portion having an appearance of a twist-knot associated with a twisted pretzel formed by twisting a folding a rope of pretzel dough over and on itself.

FIG. 4 is a view in elevation of a second face 25*b* of a plate 25 of a die 19, which in this figure is shown upside down to its preferred orientation when in use.

FIG. 5 is a view in elevation of a first face 25*a* of a plate 25 of a die 19 with inserts 55, 59, and 61 secured in place at the left most pretzel-shaped opening 23 of the die 19, insert 57 shown in an exploded view at the left most pretzel-shaped opening 23 of the die 19, and the inserts 55, 57, 59 and 61 removed from the middle and right most pretzel shaped openings 23 of the die 19.

FIG. 6 is an enlarged view of a portion of the second face 25*b* of the plate 25 of the die 19 indicated by the circle in FIG. 4.

FIG. 7 is a view in cross-section taken along the lines and arrows 7-7 shown in FIG. 6.

DETAILED DESCRIPTION

Figure 8:
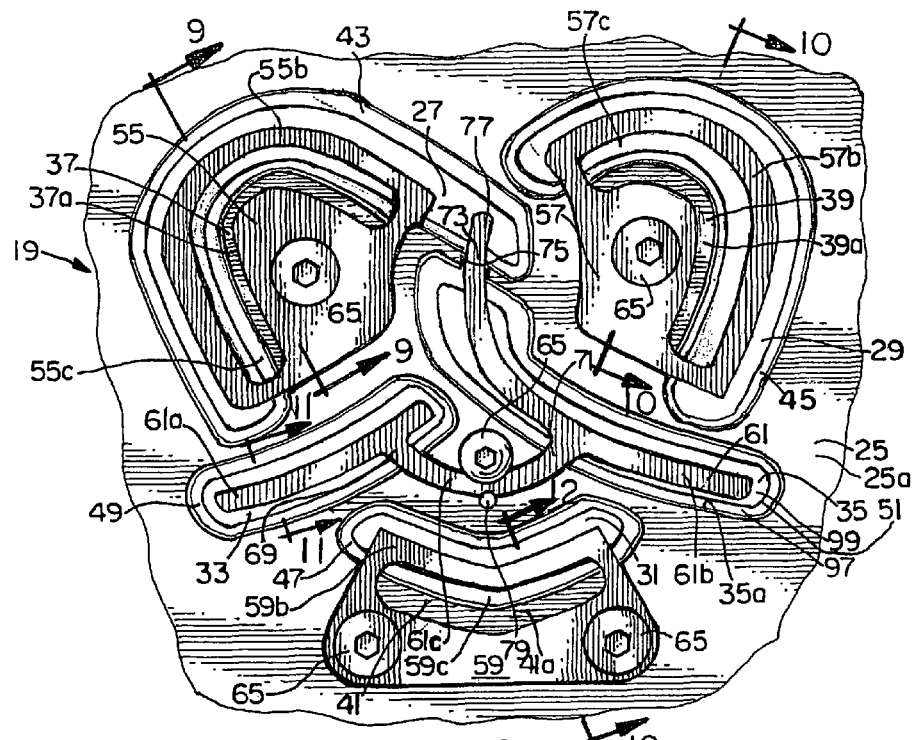
FIG. 8 is a view in elevation of a die 19 constructed in accordance with the invention.

Turning now to the drawings, there is shown schematically in FIG. 1 an apparatus 11, constructed in accordance with a preferred embodiment of my invention, for making an extruded three loop pretzel having a twist-knot appearance at the pretzel's middle portion.

Apparatus 11 preferably includes a mixer 13 for receiving and mixing raw materials together to form pretzel dough. Preferably, the mixer 13 is provided with a device 15, such as a DOUGHBOT™ dough handler sold by Reading Pretzel Machinery Corp., for automatically portioning pretzel dough formed in the mixer 13 into pretzel dough loaves 16 and delivering the dough loaves 16 to an extruder 17, thereby eliminating having a baker feed the pretzel dough by hand to the extruder 17.

The extruder 17 may be any type of extruder suitable for extruding pretzel dough, and an extruder having twin augers driven by an electric motor is preferred. In this preferred embodiment of the invention, four sets of dies 19 are mounted on the extruder 17 at the pretzel dough outlet port 21 of the extruder 17, and each die 19 (see FIGS. 4 and 5) has three sets of openings 23 (each opening 23 having a disjointed three loop pretzel shape formed by a set of channels 27, 29, 31, 33, and 35 extending through the die 19) extending through the die 19. However, the number of disjointed three loop pretzel-shaped openings 23 for any die 19 may vary, as desired, from one to greater than one.

Referring now to FIGS. 4, 5, and 8 to 12, and in particular to FIGS. 4 and 5, the die 19 is shown in detail. The die 19 preferably includes a metal plate 25 that has a first face 25a and a second face 25b. The metal plate 25 has portions of metal removed using end mill machining to form channels 27, 29, 31, 33, and 35 that extend completely through the plate 25. The metal plate 25 also has portions of metal removed using end mill machining to form milled-out surfaces 37, 39, 41, 43, 45, 47, 49, and 51 in its first face 25a adjacent to the channels 27, 29, 31, 33, and 35.

For each disjointed three loop pretzel-shaped opening 23 of die 19, metal inserts 55, 57, 59, and 61 are provided to define, in conjunction with the channels 27, 29, 31, 33, and 35 and portions of the milled-out surfaces 37, 39, 41, 43, 45, 47, 49, and 51, the pathway through and the dimensions of the opening 23.

Referring to FIGS. 5, 8, 9, and 14, insert 55 has a main body portion 55a and a flange 55b extending outwardly from the upper end portion of its main body portion 55a. A slot 55c is formed in the flange 55b. When the insert 55 is secured to the plate 25 (preferably with a screw 65), the main body portion 55a sits over and covers surface 37 except for a portion 37a of surface 37 adjacent to the channel 27, and the slot 55c in the flange 55b sits over the portion 37a of the surface 37 and over a portion of the channel 27 adjacent to the portion 37a of the surface 37.

Referring to FIGS. 5, 8, 10, and 13, insert 57 has a main body portion 57a and flange 57b extending outwardly from the upper end portion of its main body portion 57a. A slot 57c is formed in the flange 57b. When the insert 57 is secured to the plate 25 (preferably with a screw 65), the main body portion 57a sits over and covers surface 39 except for a portion 39a of the surface 39 adjacent to the channel 29, and the slot 57c in the flange 57b sits over the portion 39a of the surface 39 and over a portion of the channel 29 adjacent to the portion 39a of the surface 39.

Referring to FIGS. 5, 8, 12, and 16, insert 59 has a main body portion 59a and a flange 59b extending outwardly from the upper end portion of its main body portion 59a. A slot 59c is formed in the flange 59b. When the insert 59 is secured to the plate 25 (preferably with screws 65), the main body portion 59a sits over and covers surface 41 except for a portion 41a of the surface 41 adjacent to the channel 31, and the slot 59c in the flange 59b sits over the portion 41a of the surface 41 and over a portion of the channel 31 adjacent to the portion 41a of the surface 41.

Referring to FIGS. 5, 8, 11, and 15, insert 61 has generally a wishbone shape, with a first arm 61a joined to a second arm 61b by a connection arm 61c. Connection arm 61c fits snugly within a first milled-out groove 67 that is formed in the first face 25a of the metal plate 25 and extends between channel 33 and channel 35. The end portion 69 of the connection arm 61c extends out into the channel 33 to position the first arm 61a of insert 61 in the channel 33, and the end portion 71 of the connection arm 61c extends out into the channel 35 to position the second arm 61b of insert 61 in the channel 35. The second arm 61b of insert 61 has a portion 73 that rests in a second milled-out groove 75 that is formed in the first face 25a of the metal plate 25 and extends between channel 35 and channel 27. The second arm 61b of insert 61 also has an end portion 77 that projects from the groove 75 into the channel 27. Preferably, the insert 61 is secured in place by the heads of two screws 65 and 79 that may be screwed into the metal plate 25.

Preferably, the depth of grooves 67 and 75 is substantial the same as the height of the insert 61, so that the outward face 61d of the insert 61 is substantial even with the non-milled-out surface portion 25c of the first surface 25a of the metal plate 25. Likewise, the heights of the main body portions 55a, 57a, and 59a of inserts 55, 57, and 59 are substantially the same as the distance between the milled-out surfaces 37, 39, and 41 and the non-milled-out surface portion 25c of the first surface 25a of the metal plate 25, so that the outward faces 55d, 57d, and 59d of inserts 55, 57, and 59 are substantially even with the non-milled-out surface portion 25c of the first surface 25a of the metal plate 25.

Figure 9:
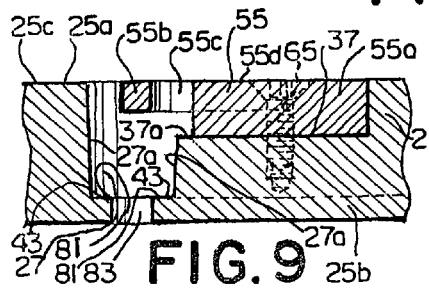
FIG. 9 is a view in cross-section taken along the lines and arrows 9-9 shown in FIG. 8.
Figure 10:
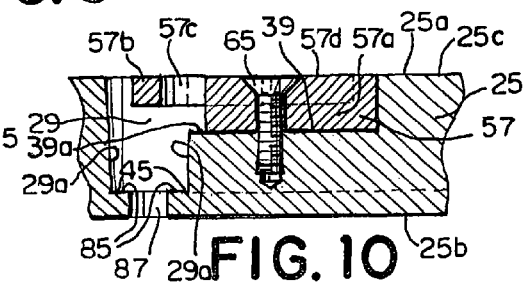
FIG. 10 is a view in cross-section taken along the lines and arrows 10-10 shown in FIG. 8.
Figure 11:
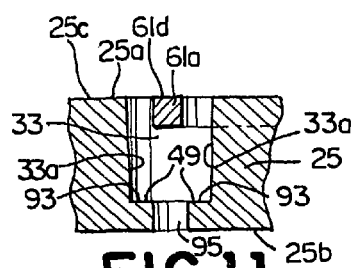
FIG. 11 is a view in cross-section taken along the lines and arrows 11-11 shown in FIG. 8.

Referring to FIGS. 8 and 9, milled-out surface 43 forms a peripheral ledge 81 that surrounds the outlet port 83 of channel 27, and the walls 27a that define channel 27 above the ledge 81 preferably have a slight inward taper from top to bottom.

Likewise, milled-out surface 45 (see FIGS. 8 and 10) forms a peripheral ledge 85 that surrounds the outlet port 87 of channel 29, and the walls 29a that define channel 29 above the ledge 85 preferably have a slight inward taper from top to bottom.

Figure 12:
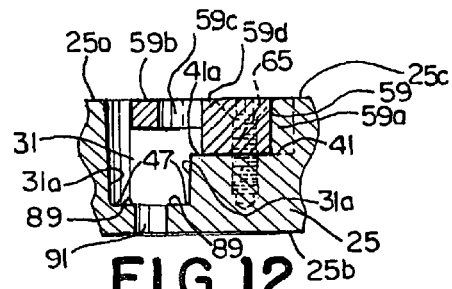
FIG. 12 is a view in cross-section taken along the lines and arrows 12-12 shown in FIG. 8.
Figure 13:
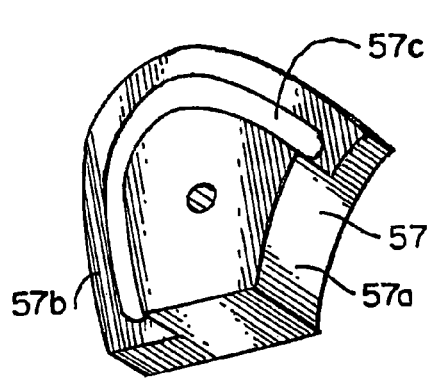
FIG. 13 is a view in perspective of an insert 57 of the die 19.
Figure 14:
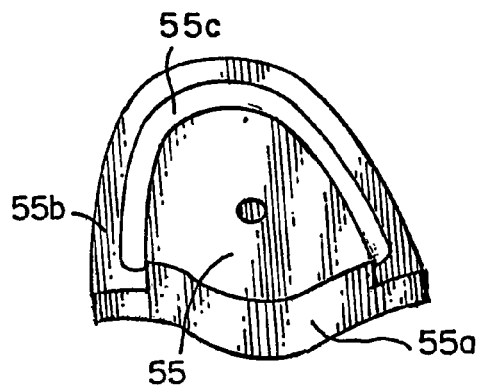
FIG. 14 is a view in perspective of an insert 55 of the die 19.
Figure 15:
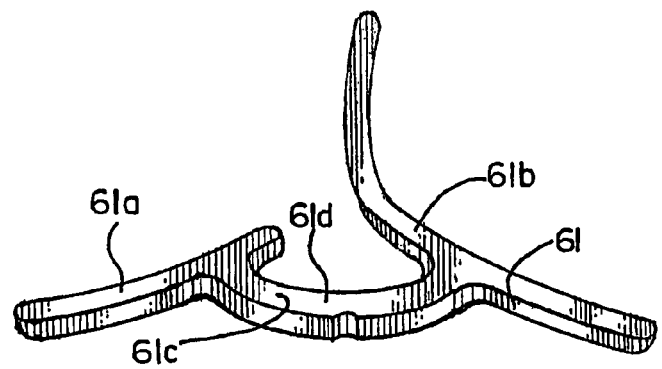
FIG. 15 is a view in perspective of an insert 61 of the die 19.
Figure 16:
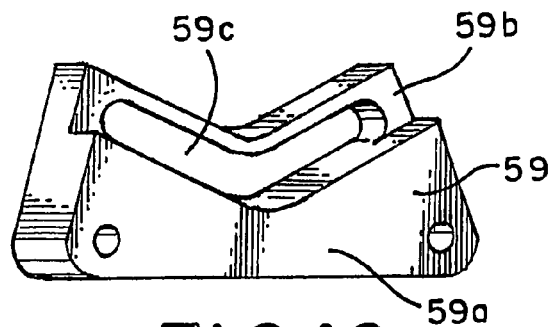
FIG. 16 is a view in perspective of an insert 59 of the die 19.

Referring to FIGS. 8 and 12, milled-out surface 47 forms a peripheral ledge 89 that surrounds the outlet port 91 of channel 31, and the walls 31a that define channel 31 above the ledge 89 preferably have a slight inward taper from top to bottom.

Milled-out surface 49 (see FIGS. 8 and 11) forms a peripheral ledge 93 that surrounds the outlet port 95 of channel 33, and the walls 33a that define channel 33 above the ledge 93 preferably have a slight inward taper from top to bottom.

Likewise, milled-out surface 51 (see FIGS. 8 and 4) forms a peripheral ledge 97 that surrounds the outlet port 99 of channel 35, and the walls 35a that define channel 35 above the ledge 97 preferably have a slight inward taper from top to bottom.

Referring now to FIGS. 4, 6, and 7, the second face 25b of the metal plate 25 preferably is provided with bleed areas 101, formed by end milling grooves 103 into the second face 25b of the metal plate 25 between adjacent end portions of channels 27, 29, 31, 33, and 35, for facilitating and promoting dough extruded from adjacent channels separated by the bleed areas 101 to connect together as the dough is extruded from the die 19. Also, each groove 103 preferably has an upwardly extending projection 105 positioned generally at the center of each bleed area 101 for directing dough as it flows across the bleed area 101.

Referring again to FIG. 1, a conventional knife or cutting device 107 is provided at the second face 25b of each die 19 for cutting across the second face 25b of each die 19 to cut each of the three loop pretzel-shaped extrudates (the twisted pretzel-shaped pretzel dough extruded from the extruder 17) 109 extruded through the dies 19. In this preferred embodiment, twelve three loop pretzel-shaped extrudates 109 are produced simultaneously and after being cut by cutting device 107 fall onto a conveyer belt system 111. Preferably, the dies 19 are positioned on the extruder 17 such that the second face 25b of the metal plate 25 shown in FIG. 4 is upside down to the orientation of the die 19 shown in FIG. 4. That is, preferably the die 19 shown in FIG. 4 would be rotated 180 degrees in the plane formed by the drawing sheet before being positioned on the extruder 17. Also, preferably, the pretzel-shaped extrudates 109 fall onto the conveyer belt system 111 without flipping over so that the bottom of each extrudate 109 rides on the surface of the conveyer belt system 111.

The conveyer belt system 111 preferably comprises a plurality of conveyer belts working in conjunction with one another to move the dough extrudates 109 after being cut from the die 19 to and though the various stations 113, 119, 121, and 123 described below, and to move finished pretzels 117 from the baking station 123 to and through the weighing and packaging station 125 also described below.

After being cut from the dies 19, the extrudates 109 are carried by the conveyer belt system 111 to and through a proofing station 113. At the proofing station 113, where the dough three loop pretzel-shaped extrudates 109 are permitted to rise as the extrudates 109 are being carried by the conveyer belt system 111, a roller 115 is provided. The roller 115 presses against the dough three loop pretzel-shaped extrudates 109 as they pass under the roller 115 while being carried on the conveyer belt system 111 to enhance the appearance of (e.g., add character to) the finished pretzels 117 formed from the extrudates 109. The roller 115 is set to rotate counterclockwise as viewed in FIG. 1, such that its outer surface in contact with the extrudates 109 when extrudates 109 are under the roller 115 moves substantially in the same direction as the conveyer belt system 111 at the roller 115, and preferably, the roller 115 is set to rotate at a rate greater than the rate of movement of the conveyer belt system 111 to give the extrudates 109 a little kick.

Following the proofing station 113 is the cooking station 119, where a pretzel cooker is provided for cooking the dough three loop pretzel-shaped extrudates 109 and applying a caustic solution to the extrudates 109 to create a skin on each of the extrudates 109 that browns when baked.

After the cooking station 119, a salting station 121 having a salter is provided for applying salt to the dough three loop pretzel-shaped extrudates 109 as the extrudates 109 move through the salting station 121 on the conveyer belt system 111 after the extrudates 109 have been exposed to caustic solution at the cooking station 119 and before the extrudates 109 are baked.

Following the salting station 121, a baking station 123 is provided for baking and drying the extrudates 109 as they move through the baking station 123 on the conveyer belt system 111, to form the finished pretzels 117. Preferably, the baking station 123 comprises an oven having a radiant heating and convection heating zone 123a, followed by a convection heating zone 123b with an underside dryer 123c, such as an oven sold by Reading Pretzel Machinery Corp. under the trademark SPECTRUM OVEN™.

A weighing and packaging station 125 is provided for portioning the finished pretzels 117 by weight and packaging the portioned finished pretzels 117.

In use, dough may be formed in the extruder 17 or placed in the extruder 17, depending upon the extruder 17 used. In the preferred embodiment of the invention disclosed herein, a mixer 15 is use to receive and mix new materials together to form the dough, and the mixer 15 has a device 15 for automatically portioning dough formed in the mixer 15 into dough loaves 16 and delivering the dough loaves 16 to the extruder 17.

The extruder 17 extrudes dough contained in the extruder 17 into and through dies 19. As the dough is forced through each disjointed three loop pretzel-shaped opening 23 of the die 19, it is rolled and shaped in the die 19 into a twisted pretzel shape having a portion having an appearance of a twist-knot associated with a twisted pretzel formed by twisting and folding a rope of pretzel dough over and on itself. The ledge-like portions 37a, 39a, and 41a, and the ledges 81, 85, 89, 93, and 97 are surfaces against which the dough is compressed and redirected by as the dough is rolled and shaped into a twisted pretzel shape.

As the extruded dough (the dough extrudate 109) moves from the die 19 from the outlet ports 83, 87, 91, 95, and 99 of channels 27, 29, 31, 33, and 35, the end portions of the extruded dough that are adjacent to one another join together, and this joining together is facilitated and promoted by the bleed areas 101 formed in the second face 25b of the die 19 since the dough at the end portions of the extruded dough tends to move into and across the bleed area 101 it is adjacent to toward an opposed end portion of extruded dough extruded from an adjacent channel. For example, referring to FIG. 6, the end portion of dough extruded from the end portion 31b of the channel 31 tends to move into and across the bleed area 101 toward the end portion of dough extruded from the end portion 35b of channel 35, while at the same time the end portion of dough extruded from the end portion 35b of channel 35 tends to move into an across the same bleed area 101 that separates the two channels 31 and 35 toward the end portion of the dough extruded from the end portion 31b of the channel 31. It should be noted the bleed areas 101, although preferred, are optional, as the adjacent end portions of dough from adjacent channels join together as the dough is extruded from the die 19.

The dough extruded from the die 19 is cut by the cutting device 107 to release a three loop pretzel-shaped extrudate 109 (the twisted pretzel-shaped pretzel dough 109) from the die 19, and the three loop pretzel-shaped extrudate 109 falls onto the conveyer belt system 111, which carries the three loop pretzel-shaped extrudate 109 to and through the proofing station 113.

At the proofing station 113, the extrudates 109 preferably are pressed against by a roller 115 to enhance the appearance of the finished pretzels 117, and each extrudate 109 preferably is given a little kick by rotating the roller 115 at a rate preferably slightly higher than the rate of movement of the conveyer belt system 111, again to add to the appearance of the finished pretzel 117. Also, while at the proofing station 113, the dough extrudate 109 is permitted to rise.

After proofing, the dough extrudates 109 then move on the conveyer belt system 111 to and through the cooking station 119, where they are cooked and exposed to caustic solution in the pretzel cooker.

Next, the dough extrudates 109 move on the conveyer belt system 111 to and through the salting station 121 (where salt is applied to the extrudates 109), to and through the baking station 123 (where the extrudates 109 are baked and dried to form finished pretzels 117), and to and through the weighing and packaging station 125 (where the finished pretzels 117 are weighed, portioned, and packaged).

The raw materials, dough mixtures, caustic solution, the amount of caustic solution applied to the dough extrudates 109, the amount of salt applied to the dough extrudates 109, cooking temperatures, baking and drying temperatures, and the lengths of time used for proofing, cooking, baking, and drying, and the speed of the conveyer belts of the conveyer belt system 111 may be those known and conventionally used in the art.

Preferably, the operation of the apparatus 11 and its component equipment are controlled via a control device 129 (e.g., control devices programmed with software such as WonderWare™ manufacturing and process control operator-machine interface software) as known in the art, which is in communication with the component equipment (e.g., the conveyer belt system 111, the mixer 13, the dough handler device 15, the extruder 17, the cutting device 107, the roller 115, and the equipment of the cooking station 119, the salting station 121, the baking station 123, and the weighing and packaging station 125) of the apparatus 11, to make the apparatus 11 automated.

If the finished pretzel 117 is to be an unsalted hard pretzel or a soft pretzel, the salting station 121 may be either by-passed or deactivated.

Turning now to FIGS. 2 and 3, a finished pretzel 117, constructed in accordance with the invention and shown in FIG. 3, stands side by side with a pretzel 127 shown in FIG. 2 made by twisting and folding a pretzel dough rope over and on itself either by hand or with the use of a pretzel twisting machine to form its twisted pretzel shape. The pretzels 117 and 127 shown in FIGS. 2 and 3 are salted. However, pretzels 117 and 127 may also be unsalted. The appearance of the inventive pretzel 117 is substantially the same as the appearance of the pretzel 127. Pretzel 127 has three loops connected together by a twist-knot 127a created by forming a dough rope and twisting and folding the dough rope over and on itself with the end portions 127b and 127c of the dough rope then being placed over the lower portion 127d of the pretzel 127. In contrast to the pretzel 127 shown in FIG. 2, the pretzel 117 shown in FIG. 3 obtains its twisted pretzel appearance and its twist-knot 117a appearance (which is substantially the same as the appearance of the twist-knot 127a of the pretzel 127) not from forming a dough rope and twisting and folding the dough rope over and on itself to obtain its twisted pretzel appearance, but from being extruded though the inventive die 19 (and optionally pressed by the roller 115). Similarly, pretzel 117 shown in FIG. 3 obtains its appearance at 117b and 117c of end portions of a dough rope being placed over the lower portion 117d of the pretzel 117 not from forming a dough rope and twisting and folding the dough rope over and on itself with the end portions of the dough rope then being placed over the lower portion of the pretzel, but from being extruded through the inventive die 19 (and optionally pressed by the roller 115).

The pretzels 117 made in accordance with the invention may be hard salted pretzels, hard unsalted pretzels, or soft pretzels.

ADVANTAGES

My invention provides a number of advantages over the prior art process and apparatus for making pretzels that use pretzel twisting machines as part of the process and apparatus for making pretzels. For instance, my invention is less labor intensive since it is almost completely automated, whereas the prior art process and apparatus that use pretzel twisting machines typically require four workers to feed dough to the prior art apparatus and to monitor the output of the pretzel twisting machines to make sure the pretzel twisting machines are functioning properly.

Also, the pretzel twisting machines used in the prior art process and apparatus are often subject to maintenance problems, which leads to lost production levels due to maintenance shut-downs of the equipment, not to mention maintenance costs. Since my invention does not use pretzel twisting machines, the down time and maintenance costs associated with pretzel twisting machines are avoided.

Also, the footprint created by the apparatus 11 of my invention is roughly ⅔ smaller than the prior art apparatus that uses pretzel twisting machines, thereby freeing up valuable floor space for other uses.

The pretzel production rate obtained from my invention appears to be at least about 50% greater than that of the prior art apparatus that uses pretzel twisting machines.

The prior art apparatus that uses pretzel twisting machines is dedicated to only one product—twisted pretzels. In contrast, the apparatus 11 of the invention may be used to create a multitude of types of product (e.g., pretzel rings, waffle pretzels, minis, etc.) merely by using different dies other than dies 19.

Further, the finished prior art pretzel 127 has a high breakage rate. On the other hand, the inventive pretzel 117 has a very low (nil to next to none) breakage rate.

The invention claimed is:

1. An apparatus for making a pretzel, comprising
   an extruder for extruding dough, the extruder having an outlet port;
   a die at the outlet port of the extruder through which dough is extruded into a pretzel shape to form pretzel-shaped extruded dough, the die having means for shaping dough into a three loop pretzel shape having a portion having an appearance of a twist-knot associated with a twisted pretzel formed by twisting and folding a rope of dough over and on itself, said die comprising a die wall structure with a first face on one side thereof, a second face on the other side thereof, and a thickness between said first face and said second face, and said means for shaping dough comprising a plurality of disjointed channels extending entirely through said die wall structure and arranged to form a pretzel shape, said die wall structure separating said plurality of disjointed channels, and each disjointed channel extending separately from the other disjointed channels from the first face of the die wall to the second face of the die wall;
   a cutting device positioned at the die for cutting the dough to release it from the die; and
   various stations for processing the dough, the various stations including a proofing station for permitting the dough to rise, a cooking station for cooking the dough and applying a caustic solution to the dough to create a skin that browns when baked, and a baking station for baking the dough to obtain a pretzel, and at least one conveyor belt for conveying the dough after being cut from the die to and through the various stations;

wherein said disjointed channels comprise five separate channels extending through the die, the five separate channels being aligned with one another to form a disjointed three loop pretzel shape, with a first channel of the five channels forming a first loop of the disjointed three loop pretzel shape, a second channel of the five channels forming a second loop of the disjointed three loop pretzel shape, a third channel of the five separate channels forming a third loop of the disjointed three loop pretzel shape, and a fourth channel and a fifth channel of the five separate channels forming inner portions of the disjointed three loop pretzel shape, and each said channel of the five separate channels being spaced apart from one another.

2. The apparatus of claim 1, further including
a mixer for receiving and mixing raw materials together to form dough.

3. The apparatus of claim 1,
the various stations further including
a roller station positioned at the proofing station, the roller station including a roller for pressing against the pretzel-shaped extruded dough formed from the die to enhance appearance of the pretzel made using the apparatus.

4. The apparatus of claim 1,
the various stations further including a salting station for applying salt to the dough after the dough has been exposed to caustic solution at the cooking station and before the dough is baked.

5. The apparatus of claim 1,
further including
bleed areas formed in the second face of the die between end portions of adjacent channels for promoting dough extruded from adjacent channels to connect.

6. The apparatus of claim 1, further including
a mixer for receiving and mixing raw materials together to form dough, and
the various stations further including
a roller station positioned at the proofing station, the roller station including a roller for pressing against the pretzel-shaped extruded dough formed from the die to enhance appearance of the pretzel made using the apparatus, and
a salting station for applying salt to the dough after the dough has been exposed to caustic solution at the cooking station and before the dough is baked.

7. A pretzel die, comprising
a plate having a die wall structure with a first face on one side thereof, a second face on the other side thereof, and a thickness between said first face and said second face, and
means formed on the plate for shaping dough into a three loop pretzel having a portion having an appearance of a twist-knot associated with a twisted pretzel formed by twisting and folding a rope of dough over and on itself, said means for shaping dough comprising a plurality of disjointed channels extending entirely through said die wall structure and arranged to form a pretzel shape, said die wall structure separating said plurality of disjointed channels, and each disjointed channel extending separately from the other disjointed channels from the first face of the die wall to the second face of the die wall, wherein said disjointed channels comprise five separate channels extending through the die, the five separate channels being aligned with one another to form a disjointed three loop pretzel shape, with a first channel of the five channels forming a first loop of the disjointed three loop pretzel shape, a second channel of the five channels forming a second loop of the disjointed three loop pretzel shape, a third channel of the five separate channels forming a third loop of the disjointed three loop pretzel shape, and a fourth channel and a fifth channel of the five separate channels forming inner portions of the disjointed three loop pretzel shape, and each said channel of the five separate channels being spaced apart from one another.

8. The pretzel die of claim 7, further including
bleed areas formed in the second face of the plate between end portions of adjacent channels for promoting dough extruded from adjacent channels to connect.

9. The apparatus of claim 7, further including
an insert provided to define in conjunction with said plurality of disjointed channels a pathway through said die, said insert having a main body portion that includes an upper end portion and a flange extending outwardly from the upper end portion of its main body portion, with a slot in said flange, wherein said insert is associated with at least one of said plurality of disjointed channels, and wherein said at least one associated insert is secured to said die so that said insert slot in said insert flange sits at the first end face over a portion of the at least one of said plurality of disjointed channels with which said insert is associated, and a portion of the insert covers in part at the first face at least one of the disjointed channels with which said insert is associated.

10. The apparatus of claim 1,
wherein a plurality of inserts are provided, and wherein said plurality of inserts are arranged such that each of the disjointed channels is covered in part at the first face by a portion of at least one insert of said plurality of inserts.

11. The apparatus of claim 3, said roller having an outer surface that when in contact with the pretzel-shaped extruded dough moves substantially in the same direction as the conveyer belt.

12. The apparatus of claim 11, wherein said conveyor belt moves at a first rate of movement and wherein said roller moves at a second rate of movement, and wherein said roller is set to rotate at a rate greater than the rate of movement of the conveyer belt.

13. The apparatus of claim 10,
each disjointed channel having at least one ledge formed therealong.

14. The pretzel die of claim 7,
wherein a plurality of inserts are provided, and wherein said plurality of inserts are arranged such that each of the disjointed channels is covered in part at the first face by a portion of at least one insert of said plurality of inserts.

15. The pretzel die of claim 14,
each disjointed channel having at least one ledge formed therealong.

16. The pretzel die of claim 9,
each disjointed channel having at least one ledge formed therealong.

* * * * *